(12) United States Patent
Liao et al.

(10) Patent No.: US 12,235,425 B2
(45) Date of Patent: Feb. 25, 2025

(54) MICROSCOPE SYSTEM, SMART MEDICAL DEVICE, AUTOMATIC FOCUSING METHOD AND STORAGE MEDIUM

(71) Applicant: Tencent Technology (Shenzhen) Company Limited, Guangdong (CN)

(72) Inventors: Jun Liao, Shenzhen (CN); Jianhua Yao, Shenzhen (CN); Xiao Han, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 856 days.

(21) Appl. No.: 17/405,833

(22) Filed: Aug. 18, 2021

(65) Prior Publication Data
US 2021/0373308 A1  Dec. 2, 2021

Related U.S. Application Data

(63) Continuation of application No. PCT/CN2020/113109, filed on Sep. 3, 2020.

(30) Foreign Application Priority Data

Sep. 25, 2019  (CN) .......................... 201910913623.0

(51) Int. Cl.
G02B 21/00 (2006.01)
G02B 21/02 (2006.01)
G02B 21/36 (2006.01)

(52) U.S. Cl.
CPC ....... G02B 21/0012 (2013.01); G02B 21/025 (2013.01); G02B 21/364 (2013.01); G02B 21/367 (2013.01)

(58) Field of Classification Search
None
See application file for complete search history.

(56) References Cited

U.S. PATENT DOCUMENTS 10,036,882 B2 *  7/2018  Sueki ....................... G02B 7/36
10,110,798 B2   10/2018  Hikida
(Continued)

FOREIGN PATENT DOCUMENTS

CN  1591173 A  3/2005
CN  1967245 A  5/2007
(Continued)

OTHER PUBLICATIONS

International Search Report and Written Opinion for priority application No. PCT/CN2020/113109, dated Nov. 27, 2020, 11p, in Chinese language.
(Continued)

Primary Examiner — Robert E. Tallman
(74) Attorney, Agent, or Firm — Crowell & Moring LLP

(57) ABSTRACT

This disclosure discloses a microscope system, a smart medical device, an automatic focusing method, and a storage medium. The smart medical device includes an objective lens, a beam splitter, an image projector assembly, a camera assembly, and a focusing device. The objective lens includes a first end and a second end, and the first end faces a to-be-observed sample. The beam splitter is disposed on the second end. The image projector assembly is in communication with the beam splitter, the image projector assembly includes a first lens and an image projection device, and light generated by the image projector assembly enters the beam splitter through the first lens. The camera assembly includes a camera. The focusing device is disposed on the camera assembly, and the focusing device is configured to perform focus adjustment on the camera.

20 Claims, 16 Drawing Sheets

(56) References Cited

U.S. PATENT DOCUMENTS

| | | |
|---|---|---|
| 2007/0075216 A1 | 4/2007 | Tohma |
| 2009/0128897 A1* | 5/2009 | Liu .................. G02B 21/06 |
| | | 359/368 |
| 2010/0118297 A1* | 5/2010 | Liu .................. H04N 7/183 |
| | | 359/372 |
| 2015/0070566 A1 | 3/2015 | Yoshida |
| 2016/0124207 A1 | 5/2016 | Aizaki |
| 2017/0227754 A1 | 8/2017 | Huang |
| 2018/0081161 A1* | 3/2018 | Abe .................. H04N 23/80 |
| 2020/0409134 A1 | 12/2020 | Yao et al. |

FOREIGN PATENT DOCUMENTS

| | | |
|---|---|---|
| CN | 101916036 A | 12/2010 |
| CN | 102595049 A | 7/2012 |
| CN | 104280886 A | 1/2015 |
| CN | 104459974 A | 3/2015 |
| CN | 104932092 A | 9/2015 |
| CN | 106062606 A | 10/2016 |
| CN | 107084923 A | 8/2017 |
| CN | 109031643 A | 12/2018 |
| CN | 110007455 A | 7/2019 |
| CN | 110673325 A | 1/2020 |
| WO | WO 2021/057422 A1 | 4/2021 |

OTHER PUBLICATIONS

English Translation of the International Search Report for priority application No. PCT/CN2020/113109, dated Nov. 27, 2020, 3p.
First Office Action with Search Report for CN 201910913623.0, dated Aug. 25, 2020, 9p, in Chinese language.
Second Office Action with Search Report for CN 201910913623.0, dated Sep. 25, 2020, 9p, in Chinese language.
Rejection Determination for CN 2019109136230, dated Nov. 18, 2020, 5p, in Chinese language.
Concise Explanation of Relevance for International Search Report, First Office Action with Search Report for CN 201910913623.0, Second Office Action with Search Report for CN 20191093623.0, and Rejection Determination for CN 201910913623.0.

* cited by examiner

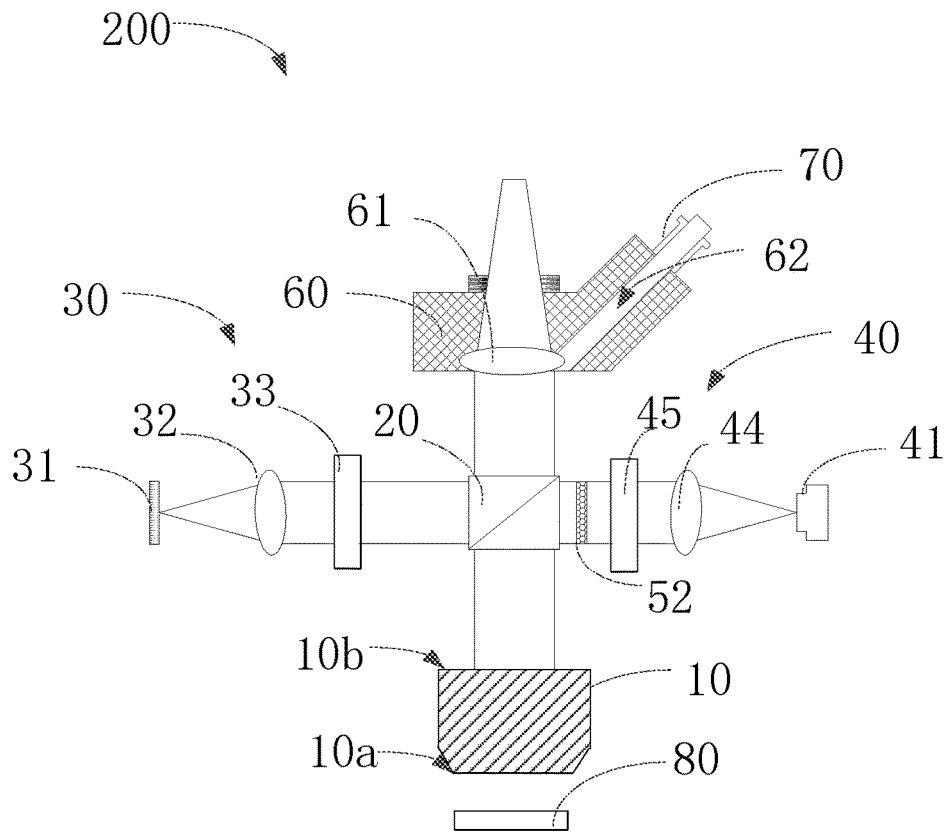

FIG. 15

| | |
|---|---|
| Obtain a plurality of images with different depths corresponding to a field of view of a target objective lens, the plurality of images with different depths being images acquired by a camera | 301 |
| Determine an index information value of each image in the plurality of images with different depths, and calculate a defocusing amount of the each image according to the index information value | 302 |
| Trigger, in a case that the defocusing amount is greater than a preset threshold, the focusing device to perform focus adjustment on the camera | 303 |

FIG. 16

Scan images layer by layer

MICROSCOPE SYSTEM, SMART MEDICAL DEVICE, AUTOMATIC FOCUSING METHOD AND STORAGE MEDIUM

RELATED APPLICATION

This application is a continuation of PCT Application No. PCT/CN2020/113109, filed Sep. 3, 2020 and entitled "MICROSCOPE SYSTEM, SMART MEDICAL DEVICE, AUTOMATIC FOCUSING METHOD AND STORAGE MEDIUM," which claims priority to Chinese Patent Application No. 201910913623.0, entitled "MICROSCOPE SYSTEM, SMART MEDICAL DEVICE, AUTOMATIC FOCUSING METHOD, AND STORAGE MEDIUM" filed with the China National Intellectual Property Administration on Sep. 25, 2019. The above applications are incorporated by reference in their entireties.

TECHNICAL FIELD

This disclosure relates to the field of medical device technologies, and in particular, to a microscope system, a smart medical device, an automatic focusing method, and a storage medium.

BACKGROUND

An artificial intelligence technology is a comprehensive discipline, covering a wide range of fields, including both hardware-level technologies and software-level technologies. Basic artificial intelligence technologies generally include technologies such as a sensor, a dedicated artificial intelligence chip, cloud computing, distributed storage, a big data processing technology, an operation/interaction system, and mechatronics.

With the research and progress of artificial intelligence technologies, the artificial intelligence technology has been researched in and applied to many fields. For example, in recent years, the augmented reality technology and artificial intelligence have been provided for use in a conventional optical microscope system. On a conventional optical microscope, images of a to-be-observed sample are acquired by using a camera, and real-time images are analyzed with reference to a machine learning algorithm.

That the camera can acquire high-quality images is a guarantee for the accuracy of the algorithm of the foregoing augmented reality microscope. A defocused image of a sample loses a lot of important optical information. Therefore, it is particularly important to ensure that the camera can acquire an accurately focused image of a sample.

SUMMARY

Embodiments of this disclosure provide a microscope system, a smart medical device, an automatic focusing method, and a storage medium, to make an image acquired by a camera be focused more accurately.

The embodiments of this disclosure provide a microscope system, including:
  an objective lens, comprising a first end and a second end disposed opposite to each other, the first end facing a to-be-observed sample;
  a beam splitter, disposed on the second end;
  an image projector assembly, comprising a first lens and an image projection device, the image projector assembly being in communication with the beam splitter and being configured to generate light entering the beam splitter through the first lens;
  a camera assembly, being in communication with the beam splitter and comprising a camera; and
  a focusing device, disposed on the camera assembly and configured to perform focus adjustment on the camera.

Correspondingly, the embodiments of this disclosure further provide a smart medical device, including:
  a microscope system as disclosed in this disclosure; and
  a processor, in communication to the microscope system, the processor being configured to cooperated with the microscope system.

Correspondingly, the embodiments of this disclosure further provide an automatic focusing method for a microscope system, applicable to the microscope system, the focusing method including:
  obtain a plurality of images with different depths corresponding to a field of view of a target objective lens, the plurality of images being images acquired by the camera;
  determine a corresponding index information value of each of the plurality of images to calculate a corresponding defocusing amount of each of the plurality of images according to the corresponding index information value; and
  trigger, when the defocusing amount is greater than a preset threshold, the focusing device to perform focus adjustment on the camera.

Correspondingly, the embodiments of this disclosure further provide a smart medical device, including a microscope system and a processor, the microscope system being the foregoing microscope system, and the processor performing the following operations:
  obtaining a plurality of images with different depths corresponding to a field of view of a target objective lens, the plurality of images with different depths being images acquired by a camera;
  determining an index information value of each image in the plurality of images with different depths, and calculating a defocusing amount of each image according to the index information value; and
  triggering, in a case that the defocusing amount is greater than a preset threshold, the focusing device to perform focus adjustment on the camera.

Correspondingly, the embodiments of this disclosure further provide a non-transitory storage medium, storing instructions, the instructions, when being executed by a processor, performing the operations in the method provided in any one of the embodiments of this disclosure.

Correspondingly, the embodiments of this disclosure further provide a non-transitory computer program product, the computer program product, when being executed, being configured to perform the operations in the method provided in any one of the embodiments of this disclosure.

According to the embodiments of this disclosure, the microscope system includes an objective lens, a beam splitter, an image projector assembly, a camera assembly, and a focusing device. The objective lens includes a first end and a second end, which are disposed opposite to each other, the first end faces a to-be-observed sample, and the beam splitter is disposed on the second end. The image projector assembly is in communication with the beam splitter, the image projector assembly includes a first lens and an image projection device, and light generated by the image projection device enters the beam splitter through the first lens. The camera assembly is in communication with the beam splitter, and the camera assembly includes a camera. The focusing device is disposed on the camera assembly, and the focusing device is configured to perform focus adjustment on the camera. According to the embodiments of this disclosure, images acquired by a camera can be focused more accurately.

BRIEF DESCRIPTION OF THE DRAWINGS

To describe the technical solutions of the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from the accompanying drawings without creative efforts.

FIG. 15 is a fourteenth schematic structural diagram of a microscope system according to an embodiment of this disclosure.

FIG. 16 is a schematic flowchart of an automatic focusing method for a microscope system according to an embodiment of this disclosure.

DESCRIPTION OF EMBODIMENTS

The technical solutions in the embodiments of this disclosure are clearly described below with reference to the accompanying drawings. Apparently, the embodiments to be described are merely a part rather than all of the embodiments of this disclosure. All other embodiments obtained by a person skilled in the art based on the embodiments of this disclosure without creative efforts shall fall within the protection scope of this disclosure.

In this disclosure, unless otherwise clearly stipulated and limited, that a first feature is "above" or "below" a second feature may include that the first feature directly contacts the second feature, or may include that the first feature does not contact the second feature directly but contacts the second feature by means of another feature between them. In addition, that the first feature is "above" the second feature includes that the first feature is right above the second feature and is not right above the second feature, or merely represents that a horizontal height of the first feature is higher than the second feature. That the first feature is "below" the second feature includes that the first feature is right below the second feature and is not right below the second feature, or merely represents that a horizontal height of the first feature is lower than the second feature.

Figure 1:
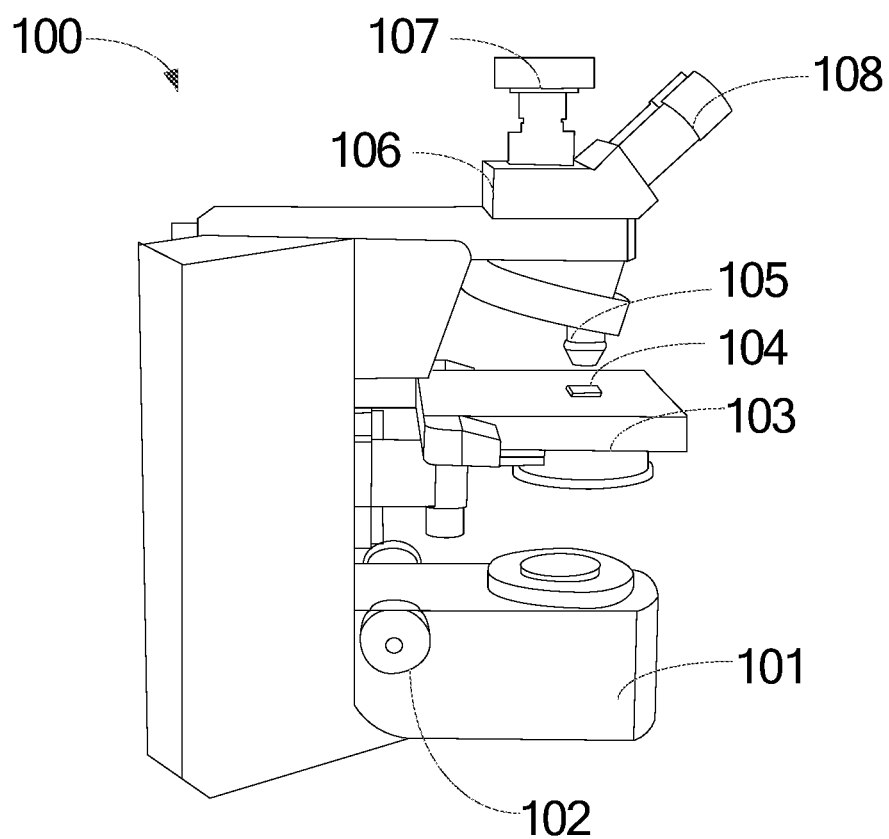
FIG. 1 is a schematic structural diagram of a microscope according to the related art.

Referring to FIG. 1, in the related art, a microscope 100 is provided. The microscope 100 includes a microscope body 101, microscope-body-stage focus adjustment knobs 102, a microscope body stage 103, a sample 104, a objective lens 105, a trinocular tube 106, a camera 107, and an eyepiece 108. The microscope body stage 103 is disposed above the microscope body 101, and the sample 104 is placed on the microscope body stage 103 for be observed. The microscope-body-stage focus adjustment knobs 102 are disposed on one or two sides of the microscope body 101, and the objective lens 105 is located above the microscope body stage 103. The trinocular tube 106 is further disposed above the objective lens 105, and the trinocular tube 106 is respectively connected to the camera 107 and the eyepiece 108. The microscope-body-stage focus adjustment knobs 102 can be adjusted to adjust the microscope body stage 103 to rise or fall in a vertical direction, so as to change a distance between the microscope body stage 103 and the objective lens 105 to implement focus adjustment. The objective lens 105 may alternatively be moved to change a distance between the microscope body stage 103 and the objective lens 105 to implement focus adjustment.

A premise of performing focus adjustment on the microscope 100 is an assumption that an end of the eyepiece 108 and an end of the camera 107 of the trinocular tube 106 are parfocal. However, an image of the camera 107 and an image at the end of the eyepiece 108 may be not parfocal due to various reasons. For example, the reasons may include that objective lenses 105 of different magnifications are not parfocalized well, that eyes of different users of the microscope 100 have different diopters, or that when the user of the microscope 100 changes, a new user does not have the consciousness of adjusting a diopter knob of the eyepiece 108 and instead, directly adjusts the microscope body stage 103 to refocus a sample, and so on. The reasons may all cause the image at the end of the eyepiece 108 of the microscope 100 and the image at the end of the camera 107 to be not parfocal. As a result, when the human eye sees a clear image, the camera 107 acquires a defocused image. Consequently, the correctness of an analysis result of an image algorithm cannot be ensured.

To improve the focus accuracy of images acquired by a camera, the embodiments of this disclosure provide a microscope system, and the microscope system is described in detail below.

Figure 2:
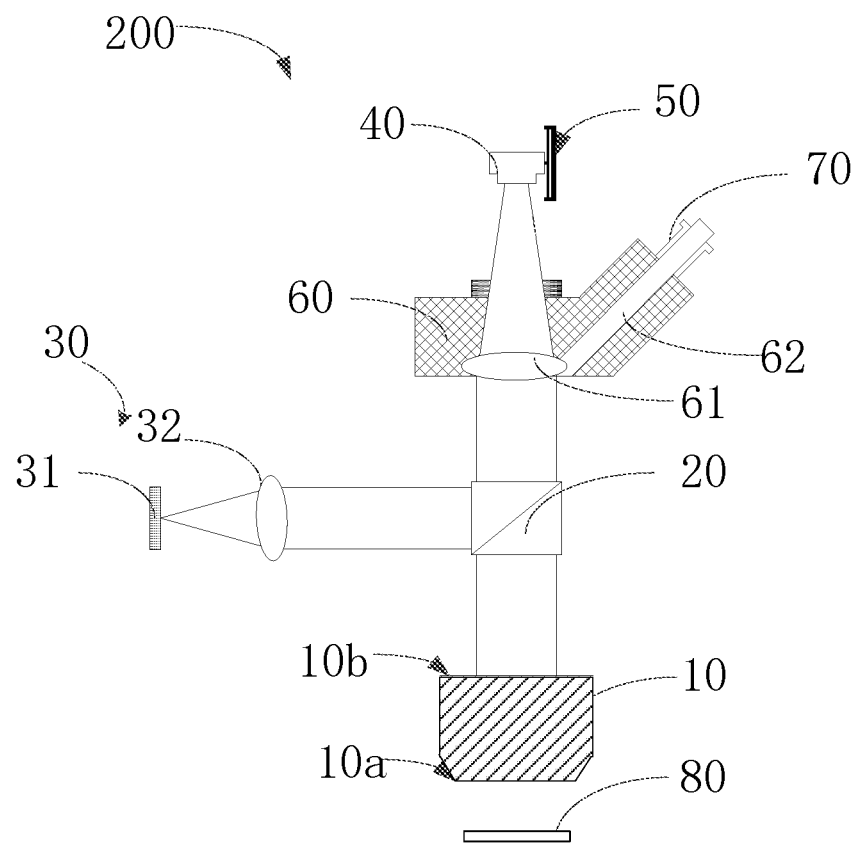
FIG. 2 is a first schematic structural diagram of a microscope system to an embodiment of this disclosure.

Referring FIG. 2, the embodiments of this disclosure provide a microscope system 200. The microscope system 200 specifically includes an objective lens 10, a beam splitter 20, an image projector assembly 30, a camera assembly 40, and a focusing device 50. The objective lens 10 includes a first end 10a and a second end 10b, which are disposed opposite to each other, the first end 10a faces a sample 80, and the beam splitter 20 is disposed on the second end 10b. The image projector assembly 30 is in communication with the beam splitter 20, the image projector assembly 30 includes a first lens 32 and an image projection device 31, and light generated by the image projection device 31 enters the beam splitter 20 through the first lens 32. The camera assembly 40 is in communication with the beam splitter 20, and the camera assembly 40 includes a camera 41. The focusing device 50 is disposed on the camera assembly 40, and the focusing device 50 is configured to perform focus adjustment on the camera.

The objective lens 10, the beam splitter 20, the image projector assembly 30, the camera assembly 40, and the focusing device 50 may be mounted on the microscope body to form a whole. Correspondingly, an eyepiece 70 may be further disposed above the beam splitter 20, and the eyepiece 70 is configured to observe an image of a sample 80.

The first end 10a and the second end 10b are disposed opposite to each other, and positions of the first end 10a and the second end 10b can be exchanged. In this embodiment, unless otherwise specified, the first end 10a is a lower end of the objective lens 10 and the second end 10b is an upper end of the objective lens 10. The first end 10a of the objective lens 10 faces a to-be-observed object. That is, the first end 10a of the objective lens 10 is directed at a sample, and the sample 80 may be imaged by using the objective lens 10.

In addition, the beam splitter 20 is disposed on the second end 10b of the objective lens 10. That is, the beam splitter 20 is disposed on the upper end of the objective lens 10, and the beam splitter 20 may reflect a part of light and transmit another part of the light.

In addition, the image projection device 31 may project a projection of augmented reality information, and a scene in which the sample 80 and the augmented reality information are superimposed may be observed at the end of the eyepiece 70.

In addition, the camera assembly 40 may receive the light reflected or transmitted by the beam splitter 20. The camera 41 may scan the image of the sample 80. Specifically, the camera 41 may provide a function of scanning a focal plane.

In addition, the focusing device 50 is disposed on the camera assembly 40, and when the image scanned by the camera 41 is inaccurately focused, the focusing device 50 may cause the camera 41 to perform focus adjustment, thereby ensuring that the camera 41 obtains an accurately focused image.

The microscope system 200 further includes a trinocular tube 60. The trinocular tube 60 is disposed on one end of the beam splitter 20 distant from the objective lens 10, and the trinocular tube 60 includes at least two channels 62 and a tube lens 61. The channels 62 are located on one end distant from the beam splitter 20, one of the channels 62 is in communication with the eyepiece 70, and the tube lens 61 is located on one end proximate to the beam splitter 20.

The trinocular tube 60 may include a plurality of channels 62, that is, a plurality of light paths may be divided along the trinocular tube 60. One of the channels 62 is in communication with the eyepiece 70, and the sample 80 may be observed by using the eyepiece 70.

The focusing device 50 includes, but is not limited to, a moving component 51 and a zoom lens 52.

The focusing device 50 may include a moving component 51, a zoom lens 52, and the like. It may be understood that the moving component 51 may drive the camera 41 to move to implement zooming of the camera 41. The moving component 51 may be a linear moving platform 511, a telescopic sleeve 512, or the like. The zoom lens 52 may be disposed in front of the camera 41, and zooming of an image obtained by the camera 41 is implemented by using the zoom lens 52. The zoom lens 52 may be a liquid zoom lens 52, or certainly may be another zoom lens 52. Therefore, there may be a plurality of structure forms of the focusing device 50. Details are not described in this embodiment of this disclosure.

Figure 3:
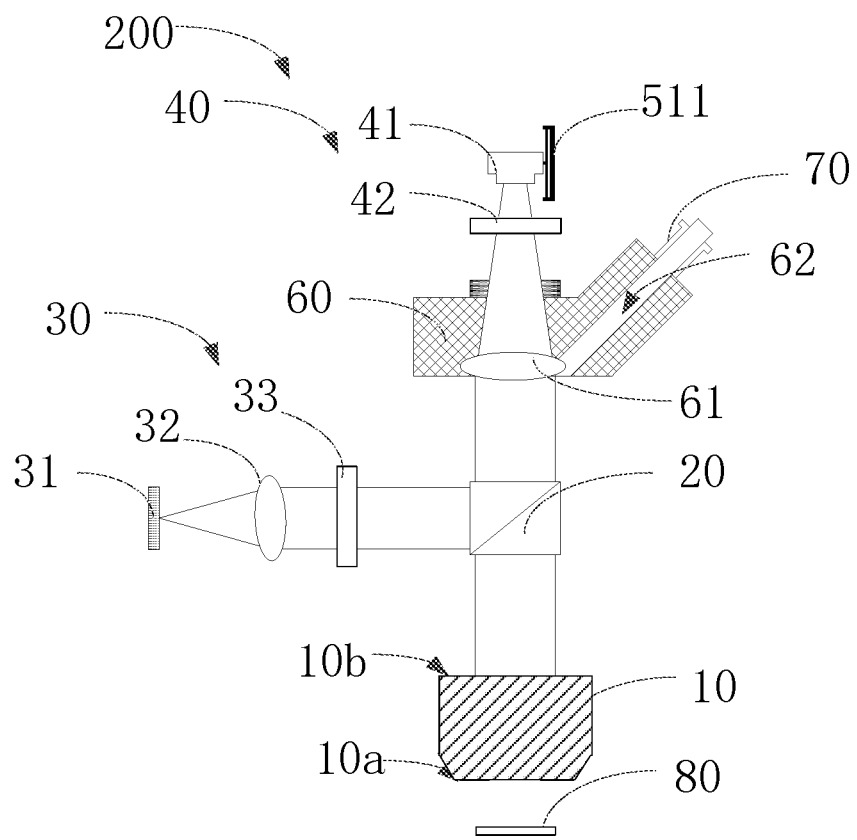
FIG. 3 is a second schematic structural diagram of a microscope system according to an embodiment of this disclosure.

Referring to FIG. 3, the moving component 51 includes a linear moving platform 511. The linear moving platform 511 is configured to drive the camera assembly 40 to approach or leave the beam splitter 20 to perform focus adjustment on the camera 41.

The linear moving platform 511 may be mounted on the microscope body, and the camera assembly 40 may be driven by the linear moving platform 511 to move. The linear moving platform 511 drives the camera assembly 40 to move, so as to focus the camera 41. The linear moving platform 511 has relatively high movement accuracy. For example, the linear moving platform 511 may have a movement accuracy of 0.5 nm, a minimum step size of 2 nm, a movement range of 13 mm to 52 mm, and a maximum load-bearing capacity of approximately 2 kg. The linear moving platform 511 drives the camera assembly 40 to move to focus the camera 41, so that the focusing accuracy of the camera 41 can be improved.

The microscope system 200 specifically includes an objective lens 10, a beam splitter 20, an image projector assembly 30, a camera assembly 40, and a trinocular tube 60. The objective lens 10 includes a first end 10a and a second end 10b, which are disposed opposite to each other. The first end 10a faces a sample 80, and the beam splitter 20 is disposed on the second end 10b. The image projector assembly 30 is in communication with the beam splitter 20. The image projector assembly 30 includes a first lens 32 and an image projection device 31, and light generated by the image projection device 31 enters the beam splitter 20 through the first lens 32. The camera assembly 40 is in communication with the beam splitter 20, and the camera assembly 40 includes a camera 41. The trinocular tube 60 is disposed on one end of the beam splitter 20 distant from the objective lens 10, and the trinocular tube 60 includes at least two channels 62 and a tube lens 61. The channels 62 are located on one end distant from the beam splitter 20. One of the channels 62 is in communication with an eyepiece 70. The tube lens 61 is located on one end proximate to the beam splitter 20, and one of the channels 62 in the trinocular tube 60 is in communication with the camera assembly 40. The camera assembly 40 further includes a first polarizer 42, and the first polarizer 42 is located between the camera 41 and the trinocular tube 60. The linear moving platform 511 drives the camera 41 to approach or leave the beam splitter 20.

In this embodiment, a light path of the microscope system 200 is as follows: light of the objective lens 10 is transmitted to the beam splitter 20; light of the image projection device 31 is transmitted to the beam splitter 20, and the beam splitter 20 transmits the light of the objective lens 10 and the light of the image projection device 31 to the trinocular tube 60 through the tube lens 61; the trinocular tube 60 respectively transmits the light to the first polarizer and the eyepiece 70 through the two channels 62, and the light passing through the first polarizer 42 is transmitted to a photosensitive chip of the camera 41; then, an image of the sample 80 may be observed by using the eyepiece 70.

It may be understood that the camera 41 is driven by using the linear moving platform 511 to approach or leave the beam splitter 20, and when an image of the sample obtained by the camera 41 is out of focus, the linear moving platform 511 may be adjusted to drive the camera 41 to move, so as to focus the camera 41, thereby ensuring that the image scanned by the camera 41 is an accurately focused image.

Figure 4:
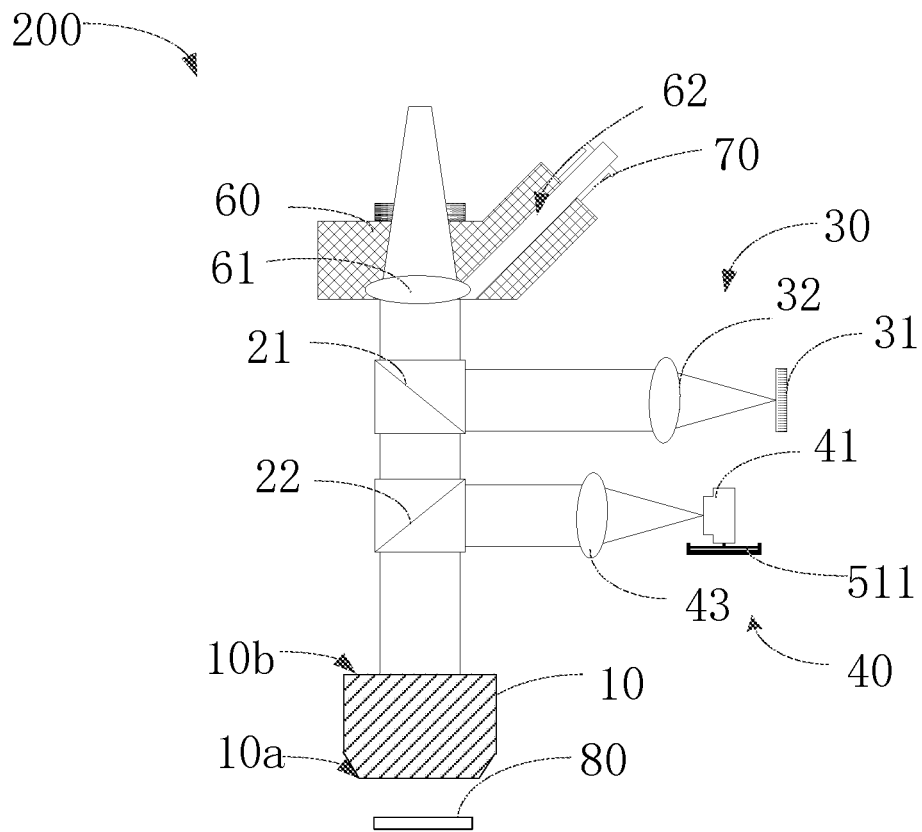
FIG. 4 is a third schematic structural diagram of a microscope system according to an embodiment of this disclosure.
Figure 5:
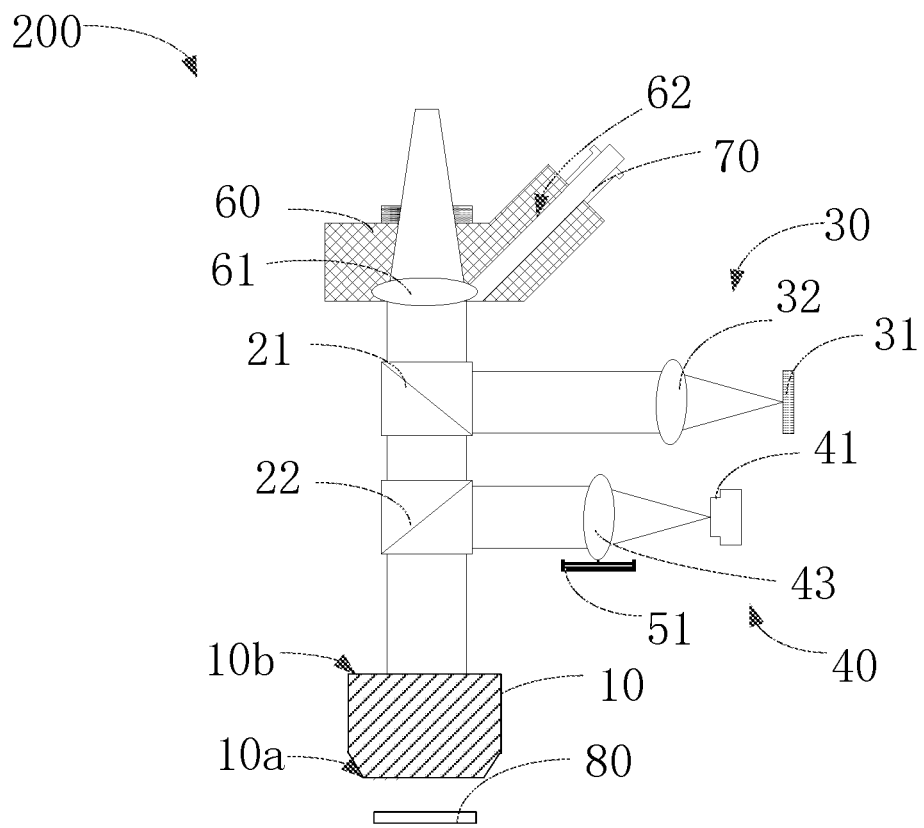
FIG. 5 is a fourth schematic structural diagram of a microscope system according to an embodiment of this disclosure.

Referring to FIG. 4 and FIG. 5, in this embodiment of this disclosure, the microscope system 200 specifically includes an objective lens 10, a beam splitter 20, an image projector assembly 30, a camera assembly 40, and a trinocular tube 60. The objective lens 10 includes a first end 10a and a second end 10b, which are disposed opposite to each other, the first end 10a faces a sample 80, and the beam splitter 20 is disposed on the second end 10b. The image projector assembly 30 includes a first lens 32 and an image projection device 31, and light generated by the image projection device 31 enters the beam splitter 20 through the first lens 32. The camera assembly 40 is in communication with the beam splitter 20, and the camera assembly 40 includes a camera 41. The trinocular tube 60 is disposed on one end of the beam splitter 20 distant from the objective lens 10, and the trinocular tube 60 includes at least two channels 62 and a tube lens 61. The channels 62 are located on one end distant from the beam splitter 20. One of the channels 62 is in communication with an eyepiece 70, and the tube lens 61 is located on one end proximate to the beam splitter 20. The beam splitter 20 includes a first sub beam splitter 21 and a second sub beam splitter 22. The first sub beam splitter 21 is in communication with the second sub beam splitter 22, the first sub beam splitter 21 is in communication with the image projector assembly 30, and the second sub beam splitter 22 is in communication with the camera assembly 40. The camera assembly 40 further includes a second lens 43, and the second lens 43 is located between the second sub beam splitter 22 and the camera 41. The linear moving platform 511 drives the camera 41 or the second lens 43 to approach or leave the second sub beam splitter 22.

In this embodiment of this disclosure, a light path of the microscope system 200 is described as follows: Light of the objective lens 10 is transmitted to the second sub beam splitter 22, and the second sub beam splitter 22 reflects a part of the light to the second lens 43 and transmits the part of the light to a photosensitive chip of the camera 41. The second sub beam splitter 22 transmits a part of the light to the first sub beam splitter 21, and light of the image projection device 31 is transmitted to the first sub beam splitter 21 through the first lens 32. The first sub beam splitter 21 transmits the light transmitted by the objective lens 10 through the tube lens 61 and reflects the light transmitted by the image projection device 31 through the tube lens 61 to reach the trinocular tube 60. The trinocular tube 60 transmits the light to the eyepiece 70, and an image of the sample 80 may be observed by using the eyepiece 70.

It may be understood that the camera 41 or the second lens 43 is driven by using the linear moving platform 511 to approach or leave the second sub beam splitter 22, and when an image of the sample obtained by the camera 41 is out of focus, the linear moving platform 511 may be adjusted to drive the camera 41 or the second lens 43 to move, so as to focus the camera 41, thereby ensuring that the image scanned by the camera 41 is an accurately focused image.

Figure 6:
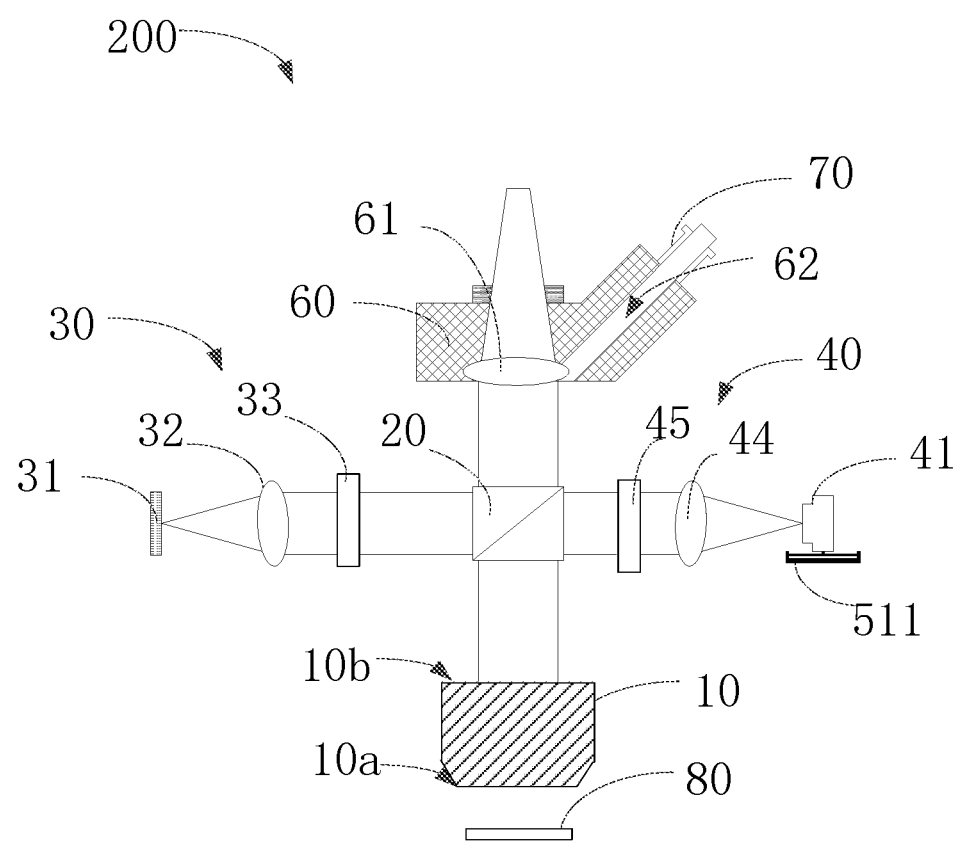
FIG. 6 is a fifth schematic structural diagram of a microscope system according to an embodiment of this disclosure.
Figure 7:
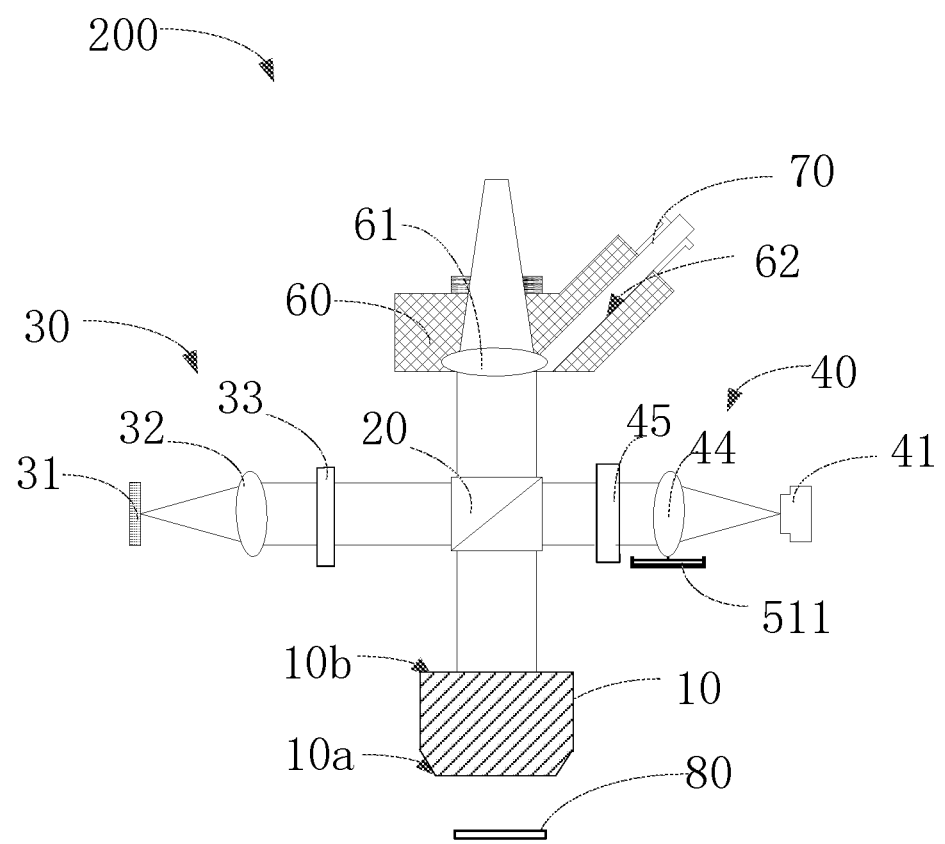
FIG. 7 is a sixth schematic structural diagram of a microscope system according to an embodiment of this disclosure.

Referring to FIG. 6 and FIG. 7, in this embodiment of this disclosure, the microscope system 200 specifically includes an objective lens 10, a beam splitter 20, an image projector assembly 30, a camera assembly 40, a trinocular tube 60, and a focusing device 50. The objective lens 10 includes a first end 10a and a second end 10b, which are disposed opposite to each other, the first end 10a faces a sample 80, and the beam splitter 20 is disposed on the second end 10b. The image projector assembly 30 is in communication with the beam splitter 20, and the image projector assembly 30 includes a first lens 32 and an image projection device 31. Light generated by the image projection device 31 enters the beam splitter 20 through the first lens 32. The camera assembly 40 is in communication with the beam splitter 20, and the camera assembly 40 includes a camera 41. The trinocular tube 60 is disposed on one end of the beam splitter 20 distant from the objective lens 10, and the trinocular tube 60 includes at least two channels 62 and a tube lens 61. The channels 62 are located on one end distant from the beam splitter 20. One of the channels 62 is in communication with an eyepiece 70, and the tube lens 61 is located on one end proximate to the beam splitter 20. The camera assembly 40 and the image projector assembly 30 are disposed opposite to each other along the beam splitter 20. The image projector assembly 30 further includes a second polarizer 33, and the second polarizer 33 is located between the first lens 32 and the beam splitter 20. The camera assembly 40 further includes a third lens 44 and a third polarizer 45, the third polarizer 45 is located between the beam splitter 20 and the third lens 44, and the third lens 44 is located between the third polarizer 45 and the camera 41. The linear moving platform 511 drives the camera 41 or the third lens 44 to approach or leave the beam splitter 20.

In this embodiment, a light path of the microscope system 200 is explained as follows: Light of the objective lens 10 is transmitted to the beam splitter 20, and light of the image projection device 31 is transmitted to the beam splitter 20 through the first lens 32 and the second polarizer 33. The beam splitter 20 reflects the light of the objective lens 10 and transmits the light to a photosensitive chip of the camera 41 through the third polarizer 45 and the third lens 44. The beam splitter 20 reflects the light of the image projection device 31 through the tube lens 61, and then transmits the light to the trinocular tube 60. The trinocular tube 60 transmits the light to the eyepiece 70 through the channels 62, and an image of the sample 80 may be observed by using the eyepiece 70.

It may be understood that the camera 41 or the third lens 44 is driven by using the linear moving platform 511 to approach or leave the beam splitter 20, and that when an image of the sample obtained by the camera 41 is out of focus, the linear moving platform 511 may be adjusted to drive the camera 41 or the third lens 44 to move, so as to focus the camera 41, thereby ensuring that the image scanned by the camera 41 is an accurately focused image.

The moving component 51 further includes a telescopic sleeve 512. The telescopic sleeve 512 is connected to the camera assembly 40 and the telescopic sleeve 512 drives the camera assembly 40 to move forward or backward in the telescopic sleeve 512 to perform focus adjustment on the camera 41.

The telescopic sleeve 512 may include a driving motor and a sleeve, and the driving motor can drive the sleeve to move forward and backward. The sleeve may be mounted on the camera 41, and the sleeve may drive the camera 41 to move forward or backward to implement zooming of the camera 41. A lens or a lens group may be mounted in the telescopic sleeve 512, and the telescopic sleeve 512 may drive the lens or the lens group to move. For example, the driving motor may be a direct-current motor or an alternating-current motor. In another example, the driving motor may be a stepper motor, an ultrasonic motor, or the like. In this embodiment of this disclosure, a specific type of the driving motor is not described in detail.

In some embodiments, a lens assembly equipped with the telescopic sleeve 512 is provided. The lens assembly equipped with the telescopic sleeve 512 includes a sleeve and a fixed-focus lens. The fixed-focus lens is mounted on the sleeve, and the sleeve may drive the fixed-focus lens to move. When the sleeve stretches and contracts, the outside of the sleeve does not rotate but linearly advances, stretches, and contracts. Therefore, the camera 41 does not rotate with the sleeve. In addition, the camera 41 may include a processor or a single-chip microcomputer.

In addition, whether the lens or the lens group is mounted in the telescopic sleeve 512 may be defined according to a specific configuration of the camera 41. When the tube lens 61 of the camera 41 has a relatively long working distance, a combination of the telescopic sleeve 512 and a lens or a sleeve assembly is not required. When the tube lens 61 of the camera 41 has a relatively short working distance, the telescopic sleeve 512 and the lens or the sleeve assembly need to be used in combination.

Figure 8:
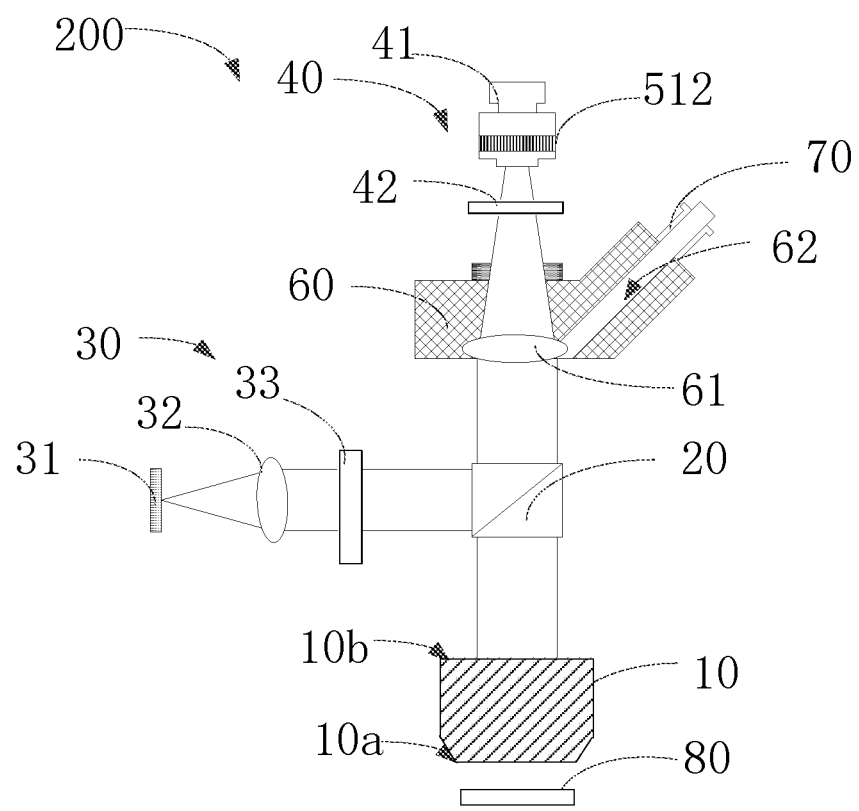
FIG. 8 is a seventh schematic structural diagram of a microscope system according to an embodiment of this disclosure.

Referring to FIG. 8, in this embodiment of this disclosure, the microscope system 200 specifically includes an objective lens 10, a beam splitter 20, an image projector assembly 30, a camera assembly 40, and a trinocular tube 60. The objective lens 10 includes a first end 10a and a second end 10b, which are disposed opposite to each other, the first end 10a faces a sample 80, and the beam splitter 20 is disposed on the second end 10b. The image projector assembly 30 is in communication with the beam splitter 20, and the image projector assembly 30 includes a first lens 32 and an image projection device 31. Light generated by the image projection device 31 enters the beam splitter 20 through the first lens 32. The camera assembly 40 is in communication with the beam splitter 20, and the camera assembly 40 includes a camera 41. The trinocular tube 60 is disposed on one end of the beam splitter 20 distant from the objective lens 10, and the trinocular tube 60 includes at least two channels 62 and a tube lens 61. The channels 62 are located on one end distant from the beam splitter 20. One of the channels 62 is in communication with an eyepiece 70, and the tube lens 61 is located on one end proximate to the beam splitter 20. The other one of the channels 62 in the trinocular tube 60 is in communication with the camera assembly 40. The camera assembly 40 further includes a first polarizer 42, the first polarizer 42 is located between the camera 41 and the trinocular tube 60, and the telescopic sleeve 512 drives the camera 41 to move forward or backward in the telescopic sleeve 512.

It may be understood that when an image of a sample obtained by the camera 41 is out of focus, the camera 41 may be driven by the telescopic sleeve 512 to move forward or backward in the telescopic sleeve 512, so as to focus the camera 41, thereby ensuring that the image scanned by the camera 41 is an accurately focused image.

Figure 9:
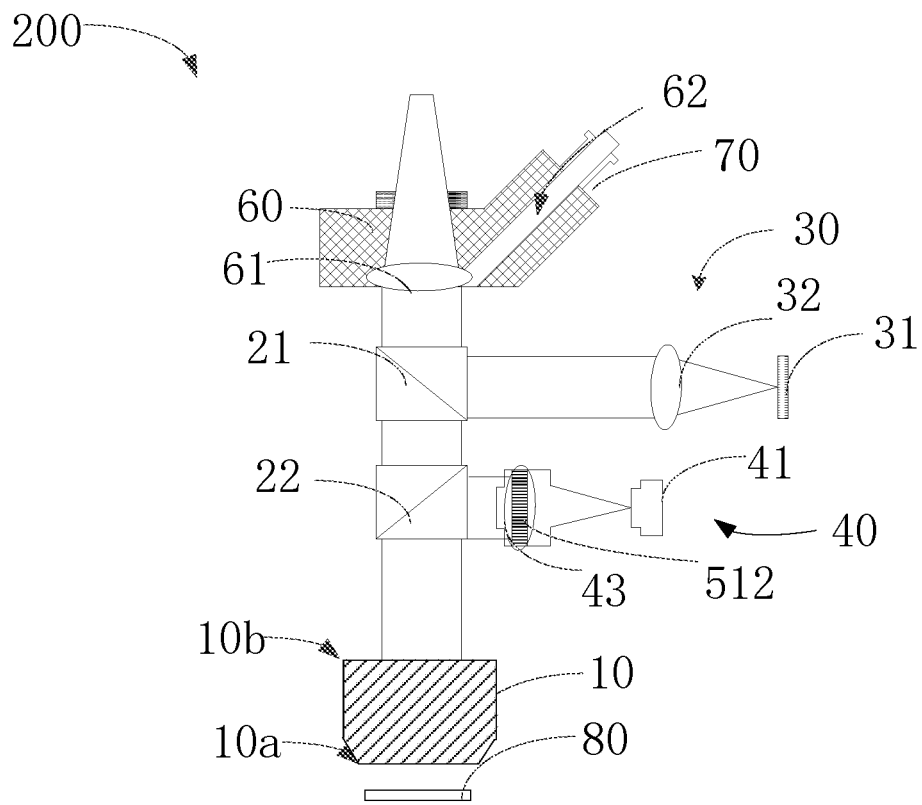
FIG. 9 is an eighth schematic structural diagram of a microscope system according to an embodiment of this disclosure.
Figure 10:
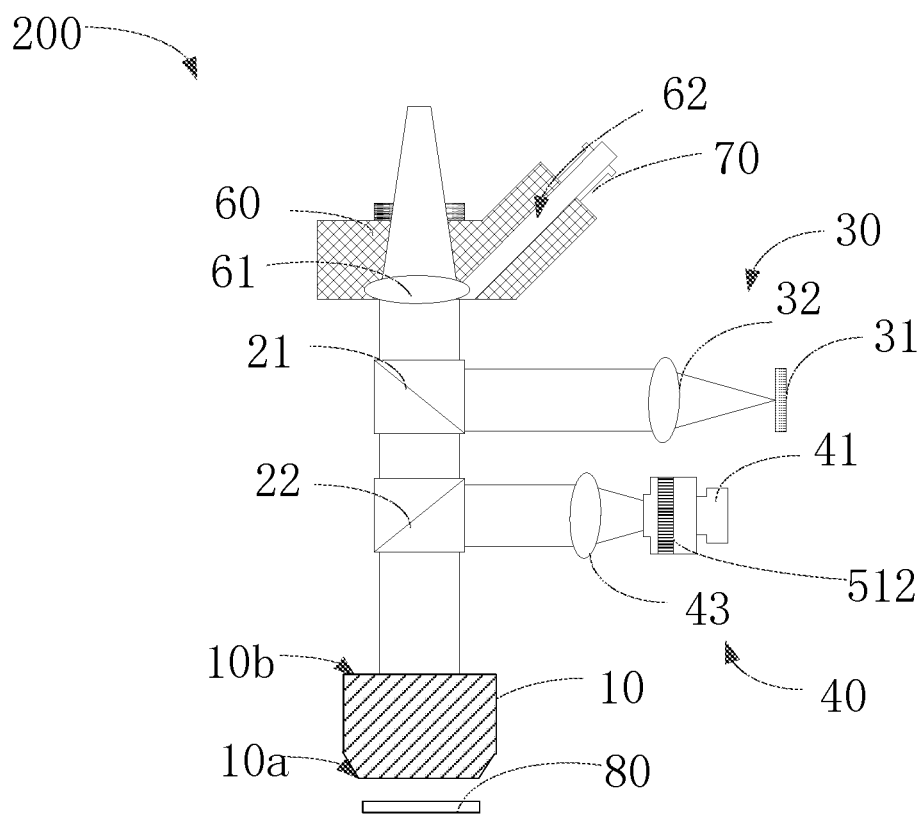
FIG. 10 is a ninth schematic structural diagram of a microscope system according to an embodiment of this disclosure.

Referring to FIG. 9 and FIG. 10, in this embodiment of this disclosure, the microscope system 200 specifically includes an objective lens 10, a beam splitter 20, an image projector assembly 30, a camera assembly 40, and a trinocular tube 60. The objective lens 10 includes a first end 10a and a second end 10b, which are disposed opposite to each other, the first end 10a faces a sample 80, and the beam splitter 20 is disposed on the second end 10b. The image projector assembly 30 includes a first lens 32 and an image projection device 31, and light generated by the image projection device 31 enters the beam splitter 20 through the first lens 32. The camera assembly 40 is in communication with the beam splitter 20, and the camera assembly 40 includes a camera 41. The trinocular tube 60 is disposed on one end of the beam splitter 20 distant from the objective lens 10, and the trinocular tube 60 includes at least two channels 62 and a tube lens 61. The channels 62 are located on one end distant from the beam splitter 20. One of the channels 62 is in communication with an eyepiece 70, and the tube lens 61 is located on one end proximate to the beam splitter 20. The beam splitter 20 includes a first sub beam splitter 21 and a second sub beam splitter 22. The first sub beam splitter 21 is in communication with the second sub beam splitter 22, the first sub beam splitter 21 is in communication with the image projector assembly 30, and the second sub beam splitter 22 is in communication with the camera assembly 40. The camera assembly 40 further includes a second lens 43, and the second lens 43 is located between the second sub beam splitter 22 and the camera 41. The telescopic sleeve 512 drives the camera 41 or the third lens 44 to move forward or backward in the telescopic sleeve 512.

It may be understood that when an image of a sample obtained by the camera 41 is out of focus, the camera 41 or the second lens 43 may be driven by the telescopic sleeve 512 to move forward or backward in the telescopic sleeve 512, so as to focus the camera 41, thereby ensuring that the image scanned by the camera 41 is an accurately focused image.

Figure 11:
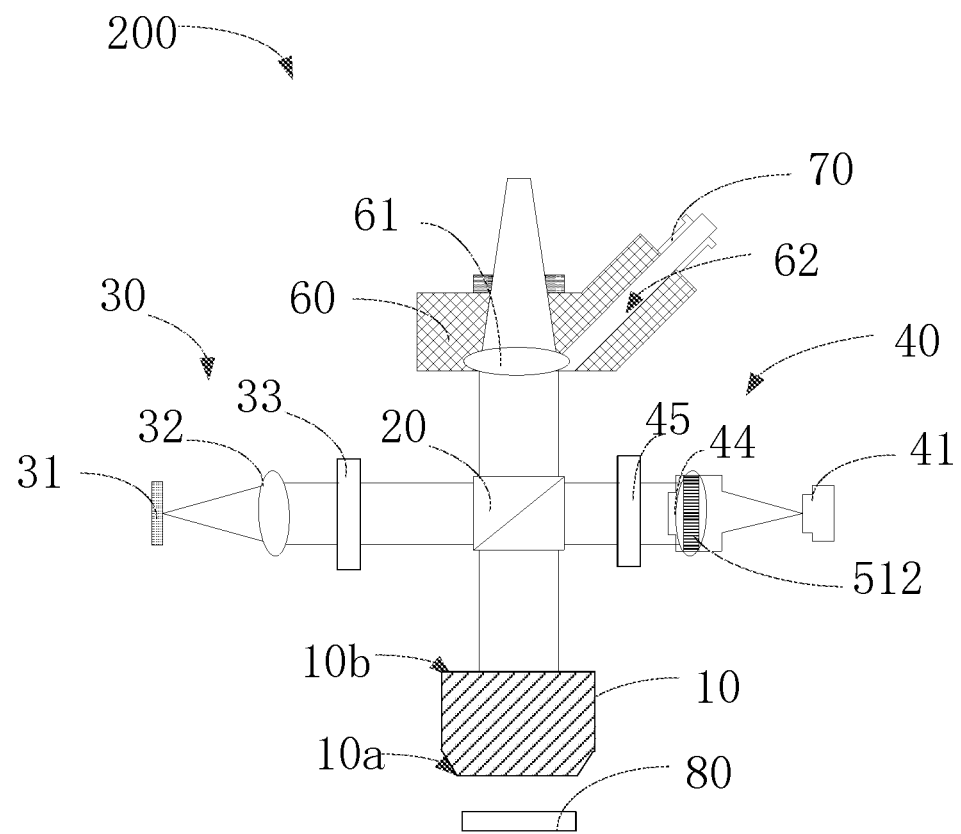
FIG. 11 is a tenth schematic structural diagram of a microscope system according to an embodiment of this disclosure.
Figure 12:
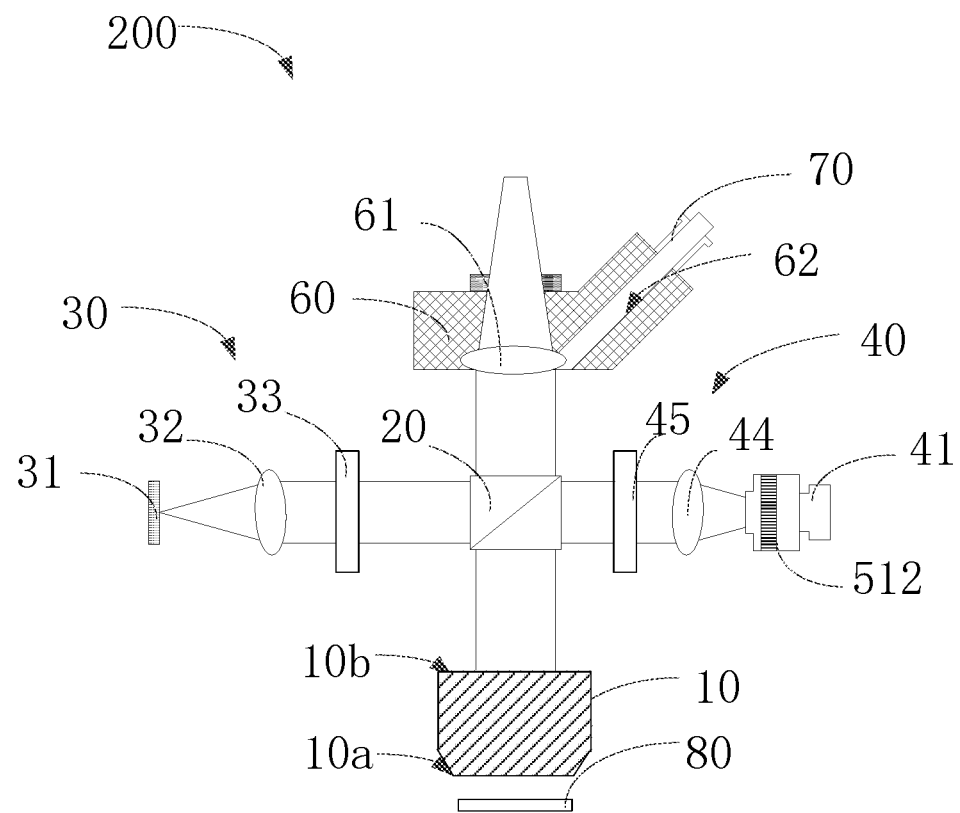
FIG. 12 is an eleventh schematic structural diagram of a microscope system to an embodiment of this disclosure.

Referring to FIG. 11 and FIG. 12, in this embodiment of this disclosure, the microscope system 200 specifically includes an objective lens 10, a beam splitter 20, an image projector assembly 30, a camera assembly 40, and a trinocular tube 60. The objective lens 10 includes a first end 10a and a second end 10b, which are disposed opposite to each other. The first end 10a faces a sample 80, and the beam splitter 20 is disposed on the second end 10b. The image projector assembly 30 is in communication with the beam splitter 20, and the image projector assembly 30 includes a first lens 32 and an image projection device 31. Light generated by the image projection device 31 enters the beam splitter 20 through the first lens 32. The camera assembly 40 is in communication with the beam splitter 20, and the camera assembly 40 includes a camera 41. The trinocular tube 60 is disposed on one end of the beam splitter 20 distant from the objective lens 10, and the trinocular tube 60 includes at least two channels 62 and a tube lens 61. The channels 62 are located on one end distant from the beam splitter 20. One of the channels 62 is in communication with an eyepiece 70, and the tube lens 61 is located on one end proximate to the beam splitter 20. The camera assembly 40 and the image projector assembly 30 are disposed opposite to each other along the beam splitter 20. The image projector assembly 30 further includes a second polarizer 33, and the second polarizer 33 is located between the first lens 32 and the beam splitter 20. The camera assembly 40 further includes a third lens 44 and a third polarizer 45. The third polarizer 45 is located between the beam splitter 20 and the third lens 44, and the third lens 44 is located between the third polarizer 45 and the camera 41. The telescopic sleeve 512 drives the camera 41 or the third lens 44 to move forward or backward in the telescopic sleeve 512.

It may be understood that when an image of a sample obtained by the camera 41 is out of focus, the camera 41 or the third lens 44 may be driven by the telescopic sleeve 512 to move forward or backward in the telescopic sleeve 512, so as to focus the camera 41, thereby ensuring that the image scanned by the camera 41 is an accurately focused image.

Figure 13:
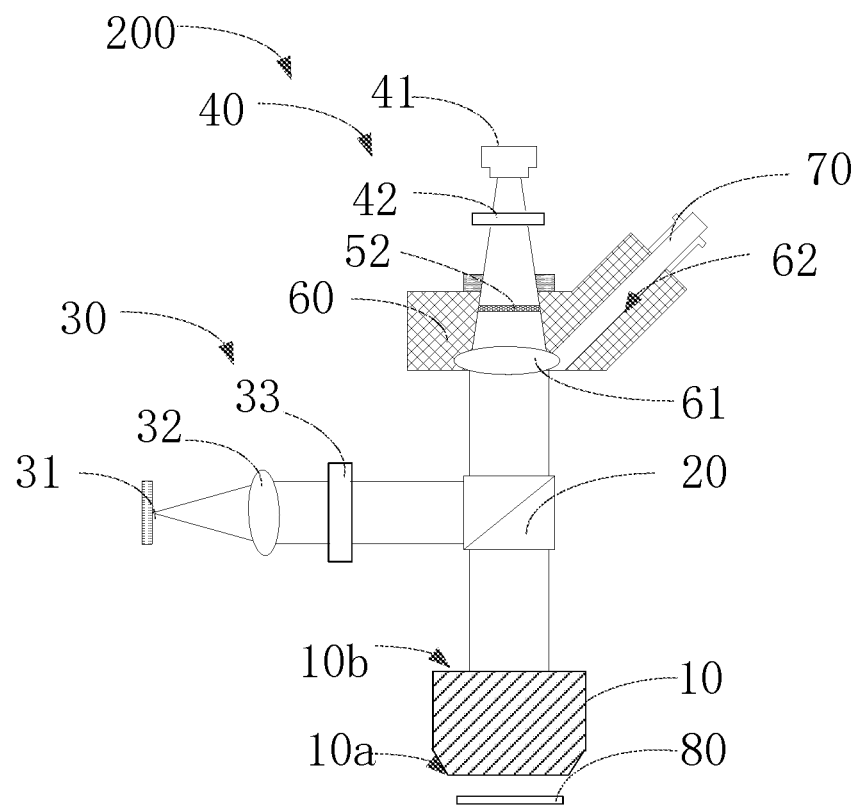
FIG. 13 is a twelfth schematic structural diagram of a microscope system according to an embodiment of this disclosure.

Referring to FIG. 13, in this embodiment of this disclosure, the microscope system 200 specifically includes an objective lens 10, a beam splitter 20, an image projector assembly 30, a camera assembly 40, and a trinocular tube 60. The objective lens 10 includes a first end 10a and a second end 10b, which are disposed opposite to each other. The first end 10a faces a sample 80, and the beam splitter 20 is disposed on the second end 10b. The image projector assembly 30 is in communication with the beam splitter 20, and the image projector assembly 30 includes a first lens 32 and an image projection device 31. Light generated by the image projection device 31 enters the beam splitter 20 through the first lens 32. The camera assembly 40 is in communication with the beam splitter 20, and the camera assembly 40 includes a camera 41. The trinocular tube 60 is disposed on one end of the beam splitter 20 distant from the objective lens 10, and the trinocular tube 60 includes at least two channels 62 and a tube lens 61. The channels 62 are located on one end distant from the beam splitter 20. One of the channels 62 is in communication with an eyepiece 70, and the tube lens 61 is located on one end proximate to the beam splitter 20. The other channels 62 in the trinocular tube 60 is in communication with the camera assembly 40. The camera assembly 40 further includes a first polarizer 42, and the first polarizer 42 is located between the camera 41 and the trinocular tube 60. A zoom lens 52 is disposed between the first polarizer 42 and the tube lens 61.

It may be understood that the zoom lens 52 is disposed between the first polarizer 42 and the tube lens 61, and the zoom lens 52 performs zooming, so as to focus the camera 41, thereby ensuring that the image scanned by the camera 41 is an accurately focused imaged.

Figure 14:
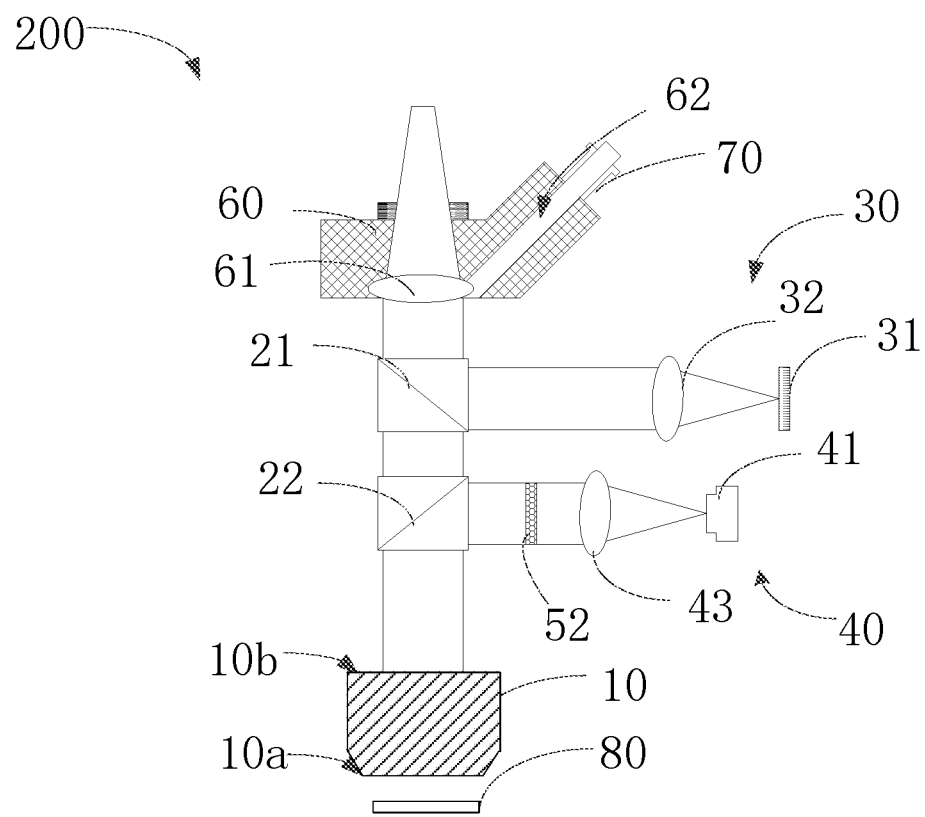
FIG. 14 is a thirteenth schematic structural diagram of a microscope system according to an embodiment of this disclosure.

Referring to FIG. 14, in this embodiment of this disclosure, the microscope system 200 specifically includes an objective lens 10, a beam splitter 20, an image projector assembly 30, a camera assembly 40, and a trinocular tube 60. The objective lens 10 includes a first end 10a and a second end 10b, which are disposed opposite to each other. The first end 10a faces a sample 80, and the beam splitter 20 is disposed on the second end 10b. The image projector assembly 30 includes a first lens 32 and an image projection device 31, and light generated by the image projection device 31 enters the beam splitter 20 through the first lens 32. The camera assembly 40 is in communication with the beam splitter 20, and the camera assembly 40 includes a camera 41. The trinocular tube 60 is disposed on one end of the beam splitter 20 distant from the objective lens 10, and the trinocular tube 60 includes at least two channels 62 and a tube lens 61. The channels 62 are located on one end distant from the beam splitter 20. One of the channels 62 is in communication with an eyepiece 70, and the tube lens 61 is located on one end proximate to the beam splitter 20. The beam splitter 20 includes a first sub beam splitter 21 and a second sub beam splitter 22. The first sub beam splitter 21 is in communication with the second sub beam splitter 22. The first sub beam splitter 21 is in communication with the image projector assembly 30, and the second sub beam splitter 22 is in communication with the camera assembly 40. The camera assembly 40 further includes a second lens 43, and the second lens 43 is located between the second sub beam splitter 22 and the camera 41. The zoom lens 52 is located between the first sub beam splitter 21 and the second lens 43.

It may be understood that the zoom lens 52 is disposed between the first sub beam splitter 21 and the second lens 43, and the zoom lens 52 performs zooming, so as to focus the camera 41, thereby ensuring that the image scanned by the camera 41 is an accurately focused imaged.

Referring to FIG. 15, in this embodiment of this disclosure, the microscope system 200 specifically includes an objective lens 10, a beam splitter 20, an image projector assembly 30, a camera assembly 40, and a trinocular tube 60. The objective lens 10 includes a first end 10a and a second end 10b, which are disposed opposite to each other, the first end 10a faces a sample 80, and the beam splitter 20 is disposed on the second end 10b. The image projector assembly 30 is in communication with the beam splitter 20. The image projector assembly 30 includes a first lens 32 and an image projection device 31, and light generated by the image projection device 31 enters the beam splitter 20 through the first lens 32. The camera assembly 40 is in communication with the beam splitter 20, and the camera assembly 40 includes a camera 41. The trinocular tube 60 is disposed on one end of the beam splitter 20 distant from the objective lens 10, and the trinocular tube 60 includes at least two channels 62 and a tube lens 61. The channels 62 are located on one end distant from the beam splitter 20. One of the channels 62 is in communication with an eyepiece 70, and the tube lens 61 is located on one end proximate to the beam splitter 20. The camera assembly 40 and the image projector assembly 30 are disposed opposite to each other along the beam splitter 20. The image projector assembly 30 further includes a second polarizer 33, and the second polarizer 33 is located between the first lens 32 and the beam splitter 20. The camera assembly 40 further includes a third lens 44 and a third polarizer 45. The third polarizer 45 is located between the beam splitter 20 and the third lens 44, and the third lens 44 is located between the third polarizer 45 and the camera 41. A zoom lens 52 is located between the beam splitter 20 and the third polarizer 45.

It may be understood that the zoom lens 52 is disposed between the beam splitter 20 and the third polarizer 45, and the zoom lens 52 performs zooming, so as to focus the camera 41, thereby ensuring that the image scanned by the camera 41 is an accurately focused imaged.

In the embodiments of this disclosure, the microscope system 200 includes an objective lens 10, a beam splitter 20, an image projector assembly 30, a camera assembly 40, and a focusing device 50. The objective lens 10 includes a first end 10a and a second end 10b, which are disposed opposite to each other, the first end 10a faces a sample 80, and the beam splitter 20 is disposed on the second end 10b. The image projector assembly 30 is in communication with the beam splitter 20, the image projector assembly 30 includes a first lens 32 and an image projection device 31, and light generated by the image projection device 31 enters the beam splitter 20 through the first lens 32. The camera assembly 40 is in communication with the beam splitter 20, and the camera assembly 40 includes a camera 41. The focusing device 50 is disposed on the camera assembly 40, and the focusing device 50 is configured to perform focus adjustment on the camera 41. In the embodiments of this disclosure, when microscope observers with different diopters changeably use microscopes, the observers perform autofocus by using the focusing device 50 instead of repeating tedious trinocular parfocal adjustment every time, thereby improving the convenience of operations. In addition, even if the objective lenses 10 of different magnifications are not parfocal or do not complete parfocal adjustment, acquisition of a clear image by the camera is not affected, and the camera may still perform autofocus when the end of the eyepiece 70 is not in focus. Finally, adjustment is performed more accurately by using the adjustment method of this disclosure.

In addition, terms "first" and "second" are used merely for the purpose of description, and shall not be construed as indicating or implying relative importance or implying a quantity of indicated technical features. In view of this, a feature defined to be "first" or "second" may explicitly or implicitly include one or more features. In the descriptions of this disclosure, "a plurality of" means two or more, unless otherwise definitely and specifically limited.

Referring to FIG. 16, the embodiments of this disclosure further provide an automatic focusing method for a microscope system, applicable to the microscope system. The focusing method specifically includes the following steps.

301. Obtain a plurality of images with different depths corresponding to a field of view of a target objective lens, the plurality of images with different depths being images acquired by a camera.

A sample may be scanned by using a camera of the microscope system to obtain a plurality of images with different depths. The camera may obtain the plurality of images with different depths by scanning the sample layer by layer. For example, the camera is driven by a focusing device to respectively acquire images at different preset depths, to obtain a plurality of images with different depths. Generally, three, four, or even more images with different depths can be obtained. To save resources, when three images with different depths are obtained, the requirements of the embodiments of this disclosure can be met.

302. Determine an index information value of each image in the plurality of images with different depths, and calculate a defocusing amount of each image according to the index information value.

Index information may be the sharpness or contrast of an image. The index information in this embodiment of this disclosure is not limited thereto. The index information value may be a calculated value of the sharpness or contrast of the image, and a defocusing amount of an image is obtained by using the value of the sharpness or contrast of the image.

For example, the index information is the sharpness of the image, and a possible implementation method for obtaining an index information value includes the following steps:

(1) Respectively extract, for each image in the plurality of images with different depths, size information of each image and a pixel value of a corresponding pixel.

Size information of each image in the plurality of images with different depths is extracted, the size information of each image may be represented as M*N, and a pixel value of a corresponding pixel may be understood as a pixel value at a coordinate point. For example, s(i,j) is a pixel value at coordinates (i,j).

(2) Calculate the index information value according to the size information of each image and the pixel value of the corresponding pixel.

The size information M*N of the plurality of images with different depths and the pixel value at the coordinates (i,j) are substituted into a formula, to obtain an index information value as follows:

$$B = \sum_{i=1}^{N}\sum_{j=1}^{M}[s(i,j) - s(i+2,j)]^2$$

where B is an index information value of an image, and images with different depths correspond to different index information values.

(3) Obtain the defocusing amount based on the index information value.

Different index information values are fitted into a curve, and a vertex of the curve is a corresponding position when the defocusing amount is zero. When the defocusing amount is closer to 0, it indicates that the image is clearer, that is, the focusing device drives the camera to reach a position to which the camera needs to be adjusted.

Figure 17:
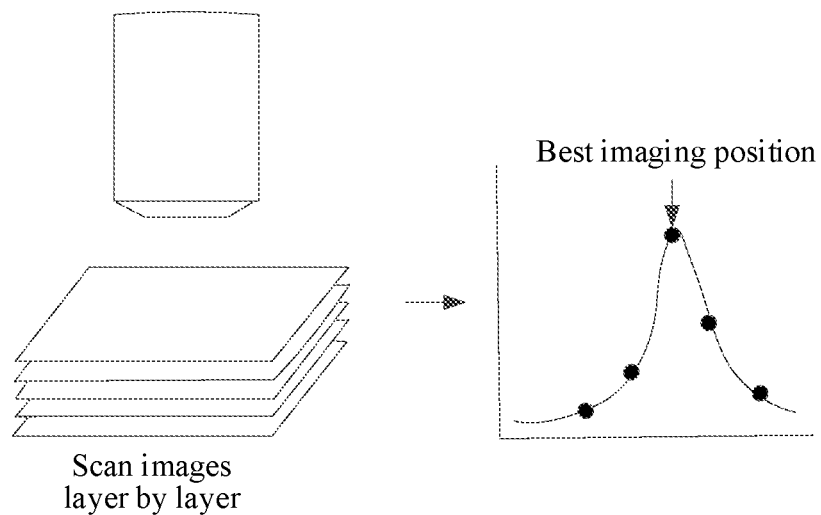
FIG. 17 is a schematic diagram of a scenario of an automatic focusing method for a microscope system according to an embodiment of this disclosure.

As shown in FIG. 17, for example, the camera scans five images with different depths, and calculated index information values of the five images with different depths are respectively B1, B2, B3, B4, and B5. A curve is fitted according to B1, B2, B3, B4, and B5. A vertex of the curve is determined as a position point at which a defocusing amount is zero, that is, a best imaging position, in other words, a position point that the camera needs to approach through adjustment.

303. Trigger, in a case that the defocusing amount is greater than a preset threshold, the focusing device to perform focus adjustment on the camera.

The preset threshold may be a manually specified threshold, and the threshold may be 0, 0.1, 0.5, or the like. Generally, the preset threshold of the defocusing amount is 0, and clarity of an image may be ensured by using the threshold. When the defocusing amount is greater than the preset threshold, the focusing device is caused to perform focus adjustment on the camera, and until the defocusing amount reaches the preset threshold, it is determined that the camera is focused accurately.

The microscope system in this embodiment of this disclosure is the foregoing microscope system. The microscope system is not described in detail in this embodiment of this disclosure.

According to the embodiments of this disclosure, a plurality of images with different depths corresponding to a field of view of a target objective lens are obtained, and the plurality of images with different depths are images acquired by a camera. An index information value of each image in the plurality of images with different depths is determined individually, a defocusing amount of each image is calculated according to the index information value, and in a case that the defocusing amount is greater than a preset threshold, the focusing device is triggered to perform focus adjustment on the camera. In the embodiments of this disclosure, when microscope observers with different diopters changeably use microscopes, the observers perform autofocus by using the focusing device instead of repeating tedious trinocular parfocal adjustment every time, thereby improving the convenience of operations. In addition, even if the objective lenses of different magnifications are not parfocal or do not complete parfocal adjustment, acquisition of a clear image by the camera is not affected, and the camera may still perform autofocus when the end of the eyepiece is not in focus. Finally, adjustment is performed more accurately by using the adjustment method of this disclosure.

In the embodiments of this disclosure, it is to be understood that terms such as "include" or "contain" are intended to indicate existence of features, numbers, steps, behaviors, components, parts, or combinations thereof disclosed in this specification, and are not intended to exclude a possibility of existence or addition of one or more other features, numbers, steps, behaviors, components, parts, or combinations thereof.

The embodiments of this disclosure further provide a smart medical device. In this embodiment of this disclosure, the smart medical device relates to the field of smart medical instruments in the field of artificial intelligence.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, the AI is a comprehensive technology of computer science, which attempts to understand the essence of intelligence and produce a new type of intelligent machine that can react in a similar way to human intelligence. The artificial intelligence is to study the design principles and implementation methods of various intelligent machines, so that the machines have the functions of perception, reasoning, and decision-making.

An artificial intelligence technology is a comprehensive discipline, covering a wide range of fields, including both hardware-level technologies and software-level technologies. Basic artificial intelligence technologies generally include technologies such as a sensor, a dedicated artificial intelligence chip, cloud computing, distributed storage, a big data processing technology, an operation/interaction system, and mechatronics. An artificial intelligence software technology mainly includes a computer vision technology, a speech processing technology, a natural language processing technology, and machine learning/deep learning.

In this embodiment of this disclosure, the smart medical device specifically includes an objective lens, a beam splitter, an image projector assembly, a camera assembly, and a focusing device. The objective lens includes a first end and a second end, which are disposed opposite to each other, the first end faces a sample, and the beam splitter is disposed on the second end. The image projector assembly is in communication with the beam splitter, the image projector assembly includes a first lens and an image projection device, and light generated by the image projection device enters the beam splitter through the first lens. The camera assembly is in communication with the beam splitter, and the camera assembly includes a camera. The focusing device is disposed on the camera assembly, and the focusing device is configured to perform focus adjustment on the camera.

Figure 18:
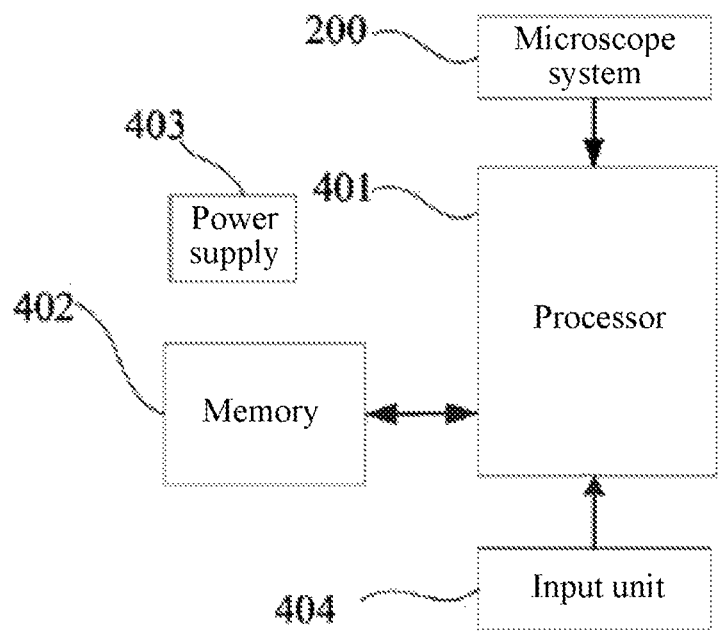
FIG. 18 is a schematic structural diagram of a smart medical device according to an embodiment of this disclosure.

The embodiments of this disclosure further provide a smart medical device, and the smart medical device may be configured to perform microscopic imaging on a sample. FIG. 18 is a schematic structural diagram of a smart medical device according to an embodiment of this disclosure. Details are provided as follows:

The smart medical device may include components such as a processor 401 of one or more processing cores, a memory 402 of one or more computer-readable storage media, a power supply 403, and an input unit 404. A person skilled in the art may understand that the structure of the smart medical device shown in FIG. 18 does not constitute a limitation to the smart medical device, and the smart medical device may include more components or fewer components than those shown in the figure, or some components may be combined, or a different component deployment may be used.

The processor 401 is the control center of the smart medical device, and is connected to various parts of the smart medical device by various interfaces and lines. By running or executing the software program and/or module stored in the memory 402, and invoking data stored in the memory 402, the processor 401 implements various functions and data processing of the smart medical device, thereby performing overall monitoring on intelligent the smart medical device. Optionally, the processor 401 may include one or more processing cores. Preferably, the processor 401 may integrate an application processor and a modem processor. The application processor mainly processes an operating system, a user interface, an application program, and the like. The modem processor mainly processes wireless communication. It can be understood that the foregoing modem processor may alternatively not be integrated into the processor 401.

The memory 402 may be configured to store a software program and module. The processor 401 runs the software program and module stored in the memory 402, to implement various functional applications and data processing. The memory 402 may mainly include a program storage area and a data storage area. The program storage area may store an operating system, an application program required by at least one function (for example, a sound playing function and an image display function), and the like. The data storage area may store data created according to use of the smart medical device, and the like. In addition, the memory 402 may include a high-speed random-access memory, and may further include a nonvolatile memory, such as at least one magnetic disk storage device, a flash memory device, or another volatile solid-state storage device. Correspondingly, the memory 402 may further include a memory controller, to provide access of the processor 401 to the memory 402.

The smart medical device further includes the power supply 403 for supplying power to the components. Optionally, the power supply 403 may be logically connected to the processor 401 by a power management system, thereby implementing functions such as charging, discharging, and power consumption management by using the power management system. The power supply 403 may further include one or more of a direct current or alternating current power supply, a re-charging system, a power failure detection circuit, a power supply converter or inverter, a power supply state indicator, and any other components.

The smart medical device may further include the input unit 404. The input unit 404 may be configured to receive entered numeric or character information and generate keyboard, mouse, joystick, optical, or trackball signal input related to user settings and function control.

The smart medical device may further include a microscope system 200, and the microscope system 200 is the foregoing microscope system 200. The microscope system 200 is not described in detail in this embodiment of this disclosure.

Although not shown in the figure, the smart medical device may further include a display unit, and the like. Details are not described herein again. Specifically, in this embodiment, the processor 401 in the smart medical device loads, into the memory 402 according to the following instructions, executable files corresponding to processes of one or more application programs, and the processor 401 runs the application programs stored in the memory 402 to implement the following various functions:

A plurality of images with different depths corresponding to a field of view of a target objective lens may be obtained, and the plurality of images with different depths are images acquired by a camera. An index information value of each image in the plurality of images with different depths is determined individually, a defocusing amount of the each image is calculated according to the index information value, and in a case that the defocusing amount is greater than a preset threshold, the focusing device is triggered to perform focus adjustment on the camera.

For specific implementations of the foregoing operations, refer to the foregoing embodiments. Details are not described herein again.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

Accordingly, the embodiments of this disclosure provide a storage medium, storing a plurality of instructions, the instructions being suitable to be loaded by a processor, to perform the steps in any automatic focusing method for a microscope system according to the embodiments of this disclosure. For example:

a plurality of images with different depths corresponding to a field of view of a target objective lens are obtained, and the plurality of images with different depths are images acquired by a camera. An index information value of each image in the plurality of images with different depths is determined individually, a defocusing amount of the each image is calculated according to the index information value, and in a case that the defocusing amount is greater than a preset threshold, the focusing device is triggered to perform focus adjustment on the camera.

For specific implementations of the foregoing operations, refer to the foregoing embodiments. Details are not described herein again.

The storage medium may include: a read-only memory (ROM), a random access memory (RAM), a magnetic disk, an optical disc, or the like.

Since the instructions stored in the storage medium may perform the steps of any method provided in the embodiments of this disclosure, the instructions can implement advantageous effects that may be implemented by any method in the embodiments of this disclosure. Refer to the foregoing embodiments for details, and details are not described herein again.

The microscope system, the smart medical device, the automatic focusing method, and the storage medium provided in the embodiments of this disclosure are described in detail above. The principle and implementations of this disclosure are described herein by using specific examples. The descriptions of the foregoing embodiments are merely used for helping understand the method and core ideas of this disclosure. In addition, a person skilled in the art can make variations to this disclosure in terms of the specific implementations and application scopes according to the ideas of this disclosure. Therefore, the content of this specification shall not be construed as a limit on this disclosure.

What is claimed is:

1. A microscope system, comprising:
   an objective lens, comprising a first end and a second end disposed opposite to each other, the first end is configured to face a to-be-observed sample;
   a beam splitter, disposed on the second end;
   an image projector assembly, comprising a first lens and an image projection device, the image projector assembly being in communication with the beam splitter and being configured to generate light entering the beam splitter through the first lens;
   a camera assembly, being in communication with the beam splitter and comprising a camera; and
   a focusing device, disposed on the camera assembly and configured to perform focus adjustment on the camera,
   wherein the light represents a first optical image information to be superposed with second optical image information of the to-be-observed sample from the objective lens via the beam slitter and in the camera assembly.

2. The microscope system according to claim 1, further comprising a trinocular tube, the trinocular tube being disposed on one end of the beam splitter distant from the objective lens, and the trinocular tube comprising at least two channels and a tube lens, the channels being located on the end distant from the beam splitter, one of the channels being in communication with an eyepiece, and the tube lens being located on one end proximate to the beam splitter.

3. The microscope system according to claim 2, wherein the focusing device comprises a moving component and a zoom lens.

4. The microscope system according to claim 3, wherein the moving component comprises a linear moving platform, the linear moving platform being configured to drive the camera assembly to approach or leave the beam splitter to perform focus adjustment on the camera.

5. The microscope system according to claim 4, wherein the other one of the channels of the trinocular tube is in communication with the camera assembly, the camera assembly further comprises a first polarizer, the first polarizer being located between the camera and the trinocular tube, and the linear moving platform is configured to drive the camera to approach or leave the beam splitter.

6. The microscope system according to claim 4, wherein:
   the beam splitter comprises a first sub beam splitter and a second sub beam splitter, the first sub beam splitter being in communication with the second sub beam splitter, the first sub beam splitter being in communication with the image projector assembly, and the second sub beam splitter being in communication with the camera assembly;
   the camera assembly further comprises a second lens, the second lens being located between the second sub beam splitter and the camera; and
   the linear moving platform is configured to drive the camera or the second lens to approach or leave the second sub beam splitter.

7. The microscope system according to claim 4, wherein:
   the camera assembly and the image projector assembly are disposed at two different sides of the beam splitter;
   the image projector assembly further comprises a second polarizer, the second polarizer being located between the first lens and the beam splitter;
   the camera assembly further comprises a third lens and a third polarizer, the third polarizer being located between the beam splitter and the third lens, and the third lens being located between the third polarizer and the camera; and the linear moving platform is configured to drive the camera or the third lens to approach or leave the beam splitter.

8. The microscope system according to claim 3, wherein the moving component further comprises a telescopic sleeve, the telescopic sleeve being connected to the camera assembly, and the telescopic sleeve driving the camera assembly to move forward or backward in the telescopic sleeve to perform focus adjustment on the camera.

9. The microscope system according to claim 8, wherein the other one of the channels of the trinocular tube is in communication with the camera assembly, the camera assembly further comprises a first polarizer, the first polarizer being located between the camera and the trinocular tube, and the telescopic sleeve is configured to drive the camera to move forward or backward in the telescopic sleeve.

10. The microscope system according to claim 8, wherein:
the beam splitter comprises a first sub beam splitter and a second sub beam splitter, the first sub beam splitter being in communication with the second sub beam splitter and with the image projector assembly, and the second sub beam splitter being in communication with the camera assembly;
the camera assembly further comprises a second lens, the second lens being located between the second sub beam splitter and the camera; and
the telescopic sleeve is configured to drive the camera or the second lens to move forward or backward in the telescopic sleeve.

11. The microscope system according to claim 8, wherein:
the camera assembly and the image projector assembly are disposed at two different sides of the beam splitter, the image projector assembly further comprises a second polarizer;
the second polarizer being located between the first lens and the beam splitter;
the camera assembly further comprises a third lens and a third polarizer, the third polarizer being located between the beam splitter and the third lens, and the third lens being located between the third polarizer and the camera; and
the telescopic sleeve is configured to drive the camera or the third lens to move forward or backward in the telescopic sleeve.

12. The microscope system according to claim 3, wherein:
the other one of the channels of the trinocular tube is in communication with the camera assembly; and
the camera assembly further comprises a first polarizer, the first polarizer being located between the camera and the trinocular tube, and the zoom lens is disposed between the first polarizer and the tube lens.

13. The microscope system according to claim 3, wherein:
the beam splitter comprises a first sub beam splitter and a second sub beam splitter, the first sub beam splitter being in communication with the second sub beam splitter and with the image projector assembly, and the second sub beam splitter being in communication with the camera assembly;
the camera assembly further comprises a second lens, the second lens being located between the second sub beam splitter and the camera; and
the zoom lens is located between the first sub beam splitter and the second lens.

14. The microscope system according to claim 3, wherein:
the camera assembly and the image projector assembly are disposed opposite to each other along the beam splitter;
the image projector assembly further comprises a second polarizer, the second polarizer being located between the first lens and the beam splitter;
the camera assembly further comprises a third lens and a third polarizer, the third polarizer being located between the beam splitter and the third lens, and the third lens being located between the third polarizer and the camera; and
the zoom lens is located between the beam splitter and the third polarizer.

15. A medical device, comprising:
the microscope system of claim 1; and
a processor, in communication to the microscope system, the processor being configured to operate the microscope system.

16. An automatic focusing method for a microscope system comprising:
providing a microscope system, comprising:
an objective lens, comprising a first end and a second end disposed opposite to each other, the first end is configured to face a to-be-observed sample;
a beam splitter, disposed on the second end;
an image projector assembly, comprising a first lens and an image projection device, the image projector assembly being in communication with the beam splitter and being configured to generate light entering the beam splitter through the first lens;
a camera assembly, being in communication with the beam splitter and comprising a camera; and
a focusing device, disposed on the camera assembly and configured to perform focus adjustment on the camera; and
obtaining a plurality of images with different depths corresponding to a field of view of a target objective lens, the plurality of images being images acquired by the camera;
determining a corresponding index information value of each of the plurality of images to calculate a corresponding defocusing amount of each of the plurality of images according to the corresponding index information value; and
triggering, when the defocusing amount is greater than a preset threshold, the focusing device to perform focus adjustment on the camera.

17. The automatic focusing method for a microscope system according to claim 16, wherein determining the corresponding index information value of each of the plurality of images to calculate the corresponding defocusing amount of each of the plurality of images according to the corresponding index information value comprises:
respectively extracting, for each of the plurality of images, corresponding size information and a pixel value of a corresponding pixel;
calculating the corresponding index information value according to the corresponding size information and the corresponding pixel value; and
obtaining the defocusing amount based on the corresponding index information value.

18. A medical device, comprising a microscope system of claim 1 and a processor, the processor being configured to cause the medical device to:
- obtain a plurality of images with different depths corresponding to a field of view of a target objective lens, the plurality of images being images acquired by the camera;
- determine a corresponding index information value of each of the plurality of images to calculate a corresponding defocusing amount of each of the plurality of images according to the corresponding index information value; and
- trigger, when the defocusing amount is greater than a preset threshold, the focusing device to perform focus adjustment on the camera.

19. The medical device of claim 18, wherein the processor is configured to cause the medical device to determine the corresponding index information value of each of the plurality of images to calculate the corresponding defocusing amount of each of the plurality of images according to the corresponding index information value by:
- respectively extracting, for each of the plurality of images, corresponding size information and a pixel value of a corresponding pixel;
- calculating the corresponding index information value according to the corresponding size information and the corresponding pixel value; and
- obtaining the defocusing amount based on the corresponding index information value.

20. A non-transitory storage medium, storing a plurality of instructions, the instructions, when executed by a processor, causes a medical device to perform the steps of claim 17.

* * * * *